United States Patent [19]
Hijikata et al.

[11] 3,887,321
[45] June 3, 1975

[54] VACUUM SEALED MOLDING APPARATUS

[75] Inventors: Itsuo Hijikata, Nagoya; Masayoshi Kasazaki; Hideto Terada, both of Toyokawa, all of Japan

[73] Assignee: Sintokogio Ltd., Japan

[22] Filed: Apr. 30, 1974

[21] Appl. No.: 465,568

Related U.S. Application Data

[62] Division of Ser. No. 334,708, Feb. 22, 1973, Pat. No. 3,843,301.

[30] Foreign Application Priority Data

Feb. 23, 1972 Japan.............................. 47-19154
Feb. 23, 1972 Japan.............................. 47-19155

[52] U.S. Cl. ................. 425/388; 164/160; 264/90; 425/175; 425/DIG. 12; 425/DIG. 60
[51] Int. Cl. .......................................... B29c 17/04
[58] Field of Search ........ 164/37, 38, 160; 425/175, 425/177, 388, 451, DIG. 12, DIG. 60; 264/90, 92, 91

[56] References Cited
UNITED STATES PATENTS

| | | | |
|---|---|---|---|
| 1,592,536 | 7/1926 | O'Neill........................ | 425/DIG. 12 |
| 2,513,785 | 7/1950 | Browne........................ | 425/DIG. 60 |
| 3,133,314 | 5/1964 | Arnould et al.................. | 425/388 |
| 3,398,434 | 8/1968 | Alesi, Jr. et al................ | 425/388 X |
| 3,703,572 | 11/1972 | Bellasalma..................... | 425/388 X |
| 3,712,771 | 1/1973 | White et al. ................... | 425/451 X |
| 3,730,250 | 5/1973 | Fellows.......................... | 164/37 X |
| 3,773,879 | 11/1973 | Munsil et al. .................. | 425/175 X |

*Primary Examiner*—Robert L. Spicer, Jr.
*Attorney, Agent, or Firm*—Armstrong, Nikaido & Wegner

[57] ABSTRACT

A vacuum sealed molding process and apparatus in which a covering sheet of synthetic resin is applied on a pattern fixed on a pattern plate at a first station, and this pattern plate is then transferred to a second station at which the pattern is removed after molding.

2 Claims, 18 Drawing Figures

VACUUM SEALED MOLDING APPARATUS

This is a division, of application Ser. No. 334,708, filed Feb. 22, 1973, now U.S. Pat. No. 3,843,301.

BACKGROUND OF THE INVENTION

This invention relates to a vacuum sealed molding process and apparatus for molding by applying a negative pressure to the interior of a molding flask charged with a heat resisting particulate material such as sand.

In a molding process commonly employed heretofore, various organic or inorganic binders are added to and thouroughly mixed with molding sand and then mixed sand is compacted inter a flask. Therefore, mixing means and compacting means such as jolting or squeezing means have been required. Further, due to the addition of the binder to the molding sand castings are generally separated from the sand by means such as a shake-out machine or knock-out machine during the knock-out step for the removal of the casting after casting. Further, sand reclamation means are required for the recovery of the separated sand. However, these means required for the molding and after-treatment have been defective in that they produce noises and vibrations of considerable degree and involve the problems of air-pollution and water contamination. Thus, some suitable means for eliminating these problems have been inevitably required, and various technical and economical difficulties and inconveniences have been encountered with the prior art molding process.

A vacuum sealed molding process has been developed recently in Japan in an effort to provide an advanced and excellent molding technique which obviates various problems as pointed out above. This vacuum sealed molding process does not use any binder at all and comprises the steps of applying a covering sheet of synthetic resin on the surface of a pattern plate having a pattern mounted thereon, setting a molding flask on the pattern, charging a heat resisting particulate material such as sand into the molding flask through material charging opening formed in the molding flask, covering the opening by a thin flexible sheet of material such as a synthetic resin or rubber after charging of the particulate material, evacuating the interior of the molding flask thereby compacting the granular material by the external pressure imparted to the granular material through the thin flexible sheet covering the opening, removing the pattern plate after the covering sheet covering the surface of the pattern and the pattern plate has been drawn to the side of the particulate material by the negative pressure imparted to the particulate material, closing flasks thus obtained and thereby completing a mold and pouring a molten metal into said mold. Knock-out of the molds can be easily attained by merely releasing the negative pressure, and thus, any external force is not required. The molds are broken down into individual particles again and castings can be taken out within a short period of time. Further, any noises, vibrations and bad smells are eliminated in this step and the recovered particulate material can be immediately used in the next molding step. Furthermore, the castings thus obtained are substantially free from defects such as blow hole and have a good casting surface and precise dimensions due to the fact that moisture, binders and any other additives are not included in the particulate material.

SUMMARY OF THE INVENTION

The present invention provides a vacuum sealed molding process comprising disposing a covering sheet above a pattern plate mounted on a movable unit and carrying a pattern thereon, applying the covering sheet on the surfaces of the pattern and the pattern plate at a first station, transferring the pattern plate to a second station by the movable unit, mounting a molding flask on the pattern, charging a heat resisting particulate material into the flask, applying a negative pressure to the interior of the flask for compacting the particulate material thereby forming a mold, and then removing the pattern plate from the mold. The present invention further provides an apparatus for carrying out such process.

It is an object of the present invention to provide a vacuum sealed molding process and apparatus capable of industrially and automatically carrying out vacuum sealed molding.

Another object of the present invention is to provide a vacuum sealed molding process and apparatus in which a single turntable is employed so that the application of the covering sheet on the surface of the pattern on the pattern plate, formation of the mold and separation of the pattern from the mold can be carried out on the same turntable, thereby reducing the period of time required for the molding operation.

Still another object of the present invention is to provide a vacuum sealed molding apparatus in which means are provided for transferring the pattern linearly so as to simplify the structure and lay-out of the apparatus.

Yet another object of the present invention is to provide a vacuum sealed molding apparatus in which means are provided for heating the covering sheet to facilitate said sheet plastic deformation as applying the sheet on the surfaces of the pattern and the pattern plate thereby to prevent undesirable shrinkage and severing of the sheet during pouring of a molten metal.

A further object of the present invention is to provide a vacuum sealed molding apparatus in which means are provided for automatically supplying the covering sheet to a position above the pattern so as to easily cover the pattern with the covering sheet.

A still further object of the present invention is to provide a vacuum sealed molding apparatus which is simple in overall structure and light in weight and which can be operated with minimized noises and vibrations.

DESCRIPTION OF THE PREFERRED EMBODIMENTS

Figure 1:
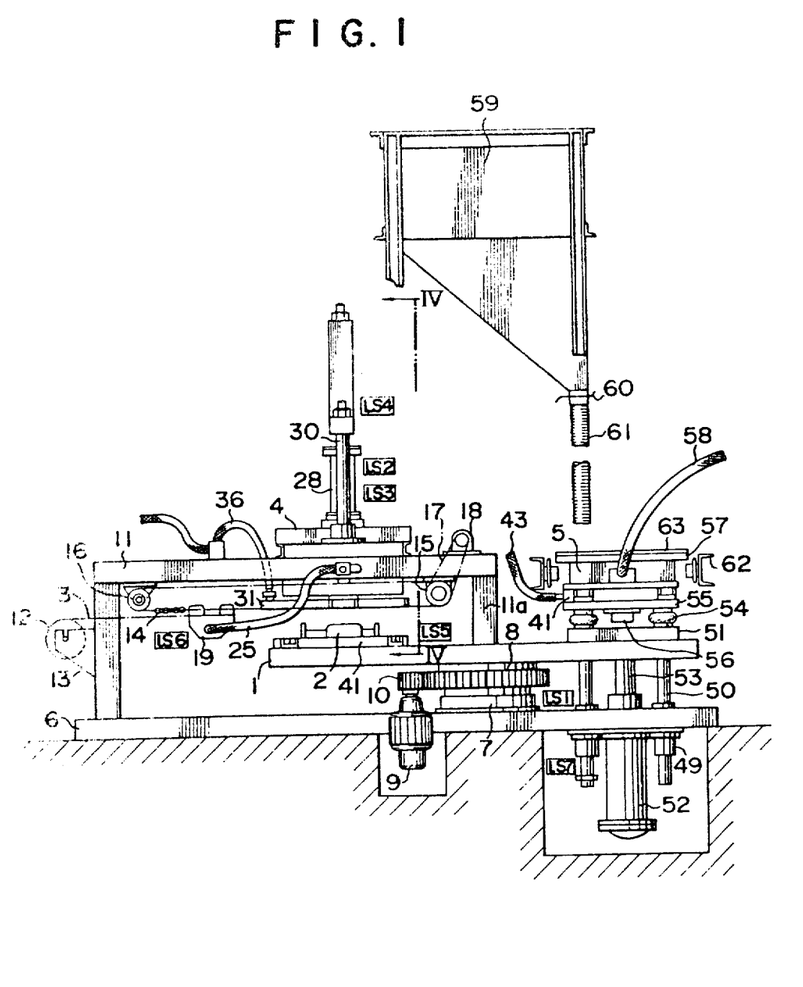
FIG. 1 is a front elevation of a vacuum sealed molding apparatus embodying the present invention.

Referring to FIGS. 1 to 7 showing an embodiment of the vacuum sealed molding apparatus according to the present invention, a covering sheet applying unit 4 and a pattern lifting unit 5 are supported on a common base 6, and a turntable 1 having a pair of opposite fork-shaped ends is rotatably supported on the common base 6 through a bearing 7. A gear 8 mounted on the central shaft of the turntable 1 is in meshing engagement with a pinion 10 secured to the drive shaft of a reduction geared motor 9 for driving the turntable 1. Referring to FIG. 1, the covering sheet applying unit 4 is supported on a frame structure 11 fixed to the base 6 and a right-hand leg 11a of the frame structure 11 extends through a central space of the gear 8 to terminate at the base 6. A covering sheet 3 in the form of a strip of synthetic resin material is wound around a supply roll 12 which is rotatably supported by a pair of brackets 13 secured to the left-hand end of the frame structure 11 so that this covering sheet 3 can be guided toward a pattern 2 carried by a pattern plate 41 mounted on one end of the turntable 1. A pair of parallel chains 14 are disposed beneath the frame structure 11 for carrying the covering sheet 3 toward the pattern 2 and are trained around driving chain wheels 15 and follower chain wheels 16 mounted on the lower portion of the frame structure 11, and the chain wheels 15 are driven through power transmission means such as chains 17 by a motor 18 mounted on the frame structure 11.

Figure 2:
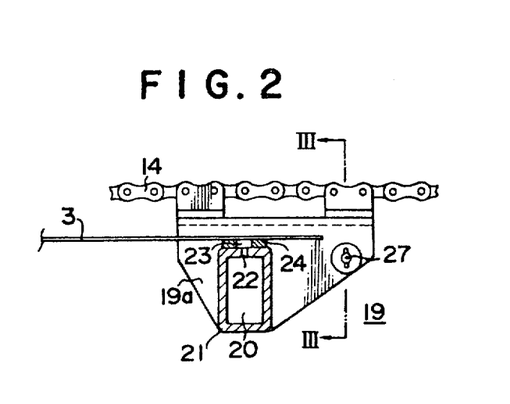
FIG. 2 is an enlarged vertical section of covering sheet holding means employed in the apparatus shown in FIG. 1.
Figure 3:
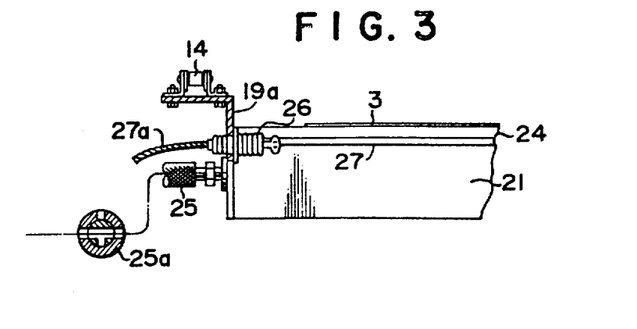
FIG. 3 is a partly sectional side elevation of the holding means, the view being taken along the line A—A in FIG. 2.

A covering sheet holding means 19 for holding, the covering sheet 3 supplied from the supply roll 12 depends from the lower runs of the chains 14 by being supported by a pair of brackets 19a as shown in FIG. 2. The covering sheet holding means 19 includes a covering sheet holding member 21 which is secured to the brackets 19a and defines therein a vacuum chamber 20 for applying vacuum suction to the covering sheet 3 thereby holding the sheet 3. Many aligned perforations 22 are bored in the upper wall of the sheet holding member 21, and an anti-skid member 24 for preventing skidding of the covering sheet 3 is secured to the upper end of the sheet holding member 21. The anti-skid member 24 is provided with a vacuum suction applying slot 23 which extends in such a direction that it registers with the line connecting the centers of the perforations 22. An air-pervious filter such as a wire gauze or felt filter is disposed in the vacuum suction applying slot 23 of the member 24. The vacuum chamber 20 of the sheet holding member 21 is connected to a source of vacuum (not shown) through a hose 25 and a valve such as a three-way valve 25a as seen in FIG. 3. Further, a heater 27 for cutting the web of the covering sheet 3 into predetermined lengths is supported between the brackets 19a of the covering sheet holding means 19 through insulators 26 as shown in FIG. 3. Leads 27a extend through the insulators 26 to connect the heater 27 to a power source (not shown) through an electromagnetic switch (not shown).

Figure 4:
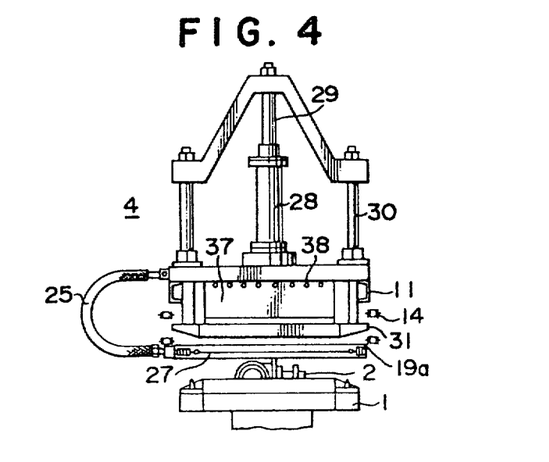
FIG. 4 is a side elevation of a covering sheet applying unit, the view being taken along the line B—B in FIG. 1.
Figure 5:
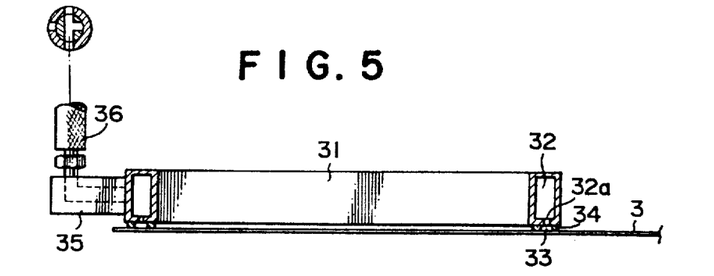
FIG. 5 is an enlarged vertical section of a frame member in the covering sheet applying unit shown in FIG. 4.
Figure 6:
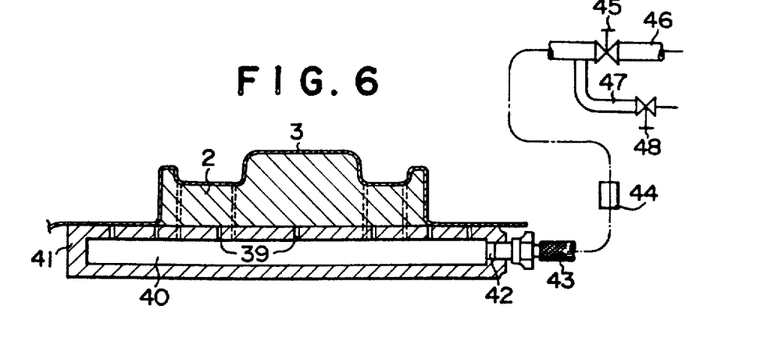
FIG. 6 is an enlarged vertical section of a pattern plate carrying a pattern thereon.

Referring to FIG. 4, the covering sheet applying unit 4 includes an air cylinder 28 mounted on the frame structure 11 above the pattern 2 disposed on one of the fork-shaped ends of the turntable 1 in one of the stationary positions of the latter. A piston rod 29 is actuated by the air cylinder 28 for causing vertical movement of a pair of guide rods 30 carrying a frame member 31 generally like a window frame at the lower end thereof. Referring to FIG. 5, this frame member 31 defines therein a vacuum chamber 32 having many aligned perforations 32a bored in the lower wall thereof, and anti-skid members 34 each having a vacuum suction applying slot 33 registering with these perforations 32a are fixed to the lower surface of the frame member 31. A filter similar to that used in the vacuum suction applying slots 23 is disposed in each of these vacuum suction applying slots 33, and a pipe joint 35 is provided at a suitable portion of the vacuum chamber 32 to be connected to the vacuum source through a hose 36 and a three-way valve. A heat insulation hood 37 and a sheathed heater 38 for heating the covering sheet 3 are disposed above the frame member 31 as shown in FIG. 4. The pattern 2 is supported on the turntable 1 by the pattern plate 41 which is provided with a vacuum chamber 40 having many perforations 39 as shown in FIG. 6. The vacuum chamber 40 is connected to the vacuum source (not shown) through a port 42, a hose 43, a rotary joint 44, a valve 45 and a conduit 46. A bypass conduit 47 having a valve 48 may be connected to a point on the downstream side of the valve 45, or in lieu of such piping, the rotary joint 44 disposed in the hose 43 may be connected to the vacuum source through a three-way valve (not shown).

Figure 7:
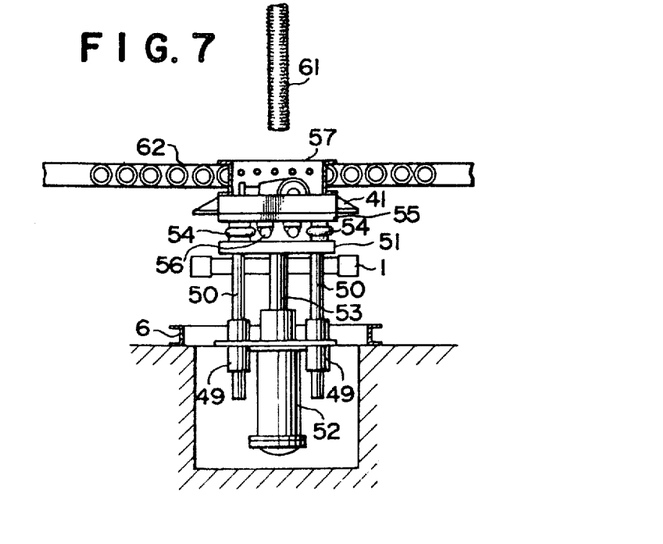
FIG. 7 is a partly cut-away side elevation of a pattern lifting unit shown in FIG. 1.

Referring to FIG. 7, the pattern lifting unit 5 includes a table 51 mounted on the top of four guide rods 50 arranged for vertical movement in corresponding bushes 49 secured at the lower end thereof to the base 6. A piston rod 53 actuated by an air cylinder 52 fixed to the base 6 is secured at its upper end to the center of the lower surface of the table 51, and another table 55 is supported on the upper surface of the table 51 through four pneumatic springs 54. A pair of vibrating motors 56 are mounted on the lower surface of the table 55. A flask 57 having an upper and a lower end opening is connected to a vacuum suction conduit 58 as shown in FIG. 1, and a hopper 59 for supplying a heat resisting particulate material such as molding sand is disposed above the apparatus so as to charge the particulate material into the flask 57 through a gate 60 and a charging pipe 61. A roller conveyor 62 is provided for conveying an empty flask 57 toward the station shown in FIG. 7 and then conveying a charged flask 57 away from the station. The upper end opening of the flask 57 filled with the particulate material is covered with a sheet 63 of material such as a synthetic resin as shown in FIG. 1. The symbols LS1 to LS7 in FIG. 1 designate limit switches.

In operation, the turntable 1 driven by the motor 9 ceases to rotate in response to the signal of the limit switch LS1 when the pattern 2 on the turntable 1 is moved to the position directly beneath the covering sheet applying unit 4. The frame member 31 holding the covering sheet 3 thereon by the vacuum suction moves downward with the movement of the piston rod 29 actuated by the air cylinder 28, and the covering sheet 3 heated by the sheathed heater 38 is brought to a position slightly vertically spaced from the pattern 2. In this case, the covering sheet 3 is free from any wrinkles due to the fact that it is tightly drawn onto the lower surface of the frame member 31 by the vacuum suction applied from the vacuum suction applying slots 33. The fact that the covering sheet 3 is brought to the position slightly vertically spaced from the pattern 2 is sensed by the limit switch LS2 and the valve 45 is opened to evacuate the vacuum chamber 40 of the pattern plate 41 so that the covering sheet 3 is now drawn onto the surface of the pattern 2. As the frame member 31 moves further downward toward the pattern 2, the three-way valve connected to the vacuum chamber 32 of the frame member 31 is closed in response to the signal of the limit switch LS3, and subsequently, this valve communicates with external air thereby disconnecting the vacuum chamber 32 from the vacuum source. This period of time may be suitably determined by means such as a timer. Further, during the downward movement of the frame member 31, the web of the covering sheet 3 extending from the supply roll 12 and held at a part thereof on the sheet holding member 21 by the vacuum suction is suitably cut into a predetermined length by being pressed onto the heater 27 which is heated in the sheet holding means 19.

Subsequently, the piston rod 29 moves upward in the air cylinder 28 in response to the signal of the timer thereby moving the frame member 31 upward away from the pattern 2. When the frame member 31 is moved to its upwardmost position, the motor 18 is energized in response to the signal of the limit switch LS4 so that the sheet holding member 21 supported between the brackets 19a is advanced while holding the covering sheet 3 thereon. The motor 18 ceases to rotate when the sheet holding member 21 is advanced to the position of the limit switch LS5. Subsequently, the three-way valve connected to the vacuum chamber 32 of the frame member 31 is opened in response to the signal of the limit switch LS5 to connect the vacuum chamber 32 to the vacuum source so that the covering sheet 3 is drawn onto the entire lower peripheral surface of the frame member 31 by the vacuum suction. In the meantime, the hose 25 connected to the vacuum chamber 20 of the sheet holding member 21 is disconnected from the vacuum source by the action of the three-way valve 25a and now communicates with atmospheric air, with the result that the covering sheet 3 is released from the sheet holding member 21. Subsequently, the brackets 19a and the sheet holding member 21 supported thereby are retracted by the operation of the motor 18 to the original position at which the limit switch LS6 is disposed. A new covering sheet 3 is drawn onto the sheet holding member 21 again in response to the signal of the limit switch LS6 to prepare for the next covering sheet application.

The pattern 2 covered with the covering sheet 3 is moved to the position of the pattern lifting unit 5 with the subsequent rotation of the turntable 1. After the turntable 1 ceases to rotate, the piston rod 53 in the air cylinder 52 is actuated to move the table 55 upward to such a position that the pattern plate 41 carrying thereon the pattern 2 covered with the covering sheet 3 engages the lower end of an empty flask 57 conveyed to a predetermined position by the roller conveyor 62. Thus, when the guide rods 50 are moved upward to reach the position of the limit switch LS7, the vibrating motors 56 are energized in response to the signal of the limit switch LS7. The operator opens the gate 60 to charge the particulate material into the flask 57. After the flask 57 is fully charged with the particulate material, the operator closes the gate 60. Then, the operator covers the entire upper end opening of the flask 57 with a covering sheet 63.

Subsequently, the interior of the flask 57 charged with the particulate material is evacuated by connecting the suction conduit 58 to the vacuum source. A vacuum is produced within the flask 57 due to the fact that the upper and lower end openings of the flask 57 are closed by the sheets of synthetic resin, and external pressure is imparted to the particulate material through the sheets thereby compacting the particulate material. While continuously imparting the external pressure to the particulate material, the valve 45 is closed to disconnect the vacuum chamber 40 from the vacuum source, and then, the valve 48 in the bypass conduit 47 is opened to supply the atmospheric pressure into the vacuum chamber 40 thereby releasing the vacuum suction applied to the covering sheet 3. The piston rod 53 in the air cylinder 52 is then retracted to move the table 55 downward for drawing out the pattern plate 41 from the molding position in the flask 57. In this case, the covering sheet 3 covering the pattern 2 is detached from the pattern 2 and remains on the corresponding surface of the particulate material in the flask 57 by the action of vacuum suction. Thus, a mold of the same shape as the pattern 2 can be molded by the particulate material. After this molding step, the flask 57 remaining on the roller conveyor 62 is conveyed by any suitable means, and the assembly consisting of the pattern 2 and the pattern plate 41 is placed on the fork-shaped end of the turntable 1 again to be brought to the position directly beneath the covering sheet applying unit 4 with the subsequent rotation of the turntable 1. During this period of time, a new covering sheet 3 is drawn onto the frame member 31 in the covering sheet applying unit 4. Subsequently, a new empty flask 57 is conveyed by the roller conveyor 62 to the predetermined position shown in FIG. 7, and one cycle is completed.

Figure 8:
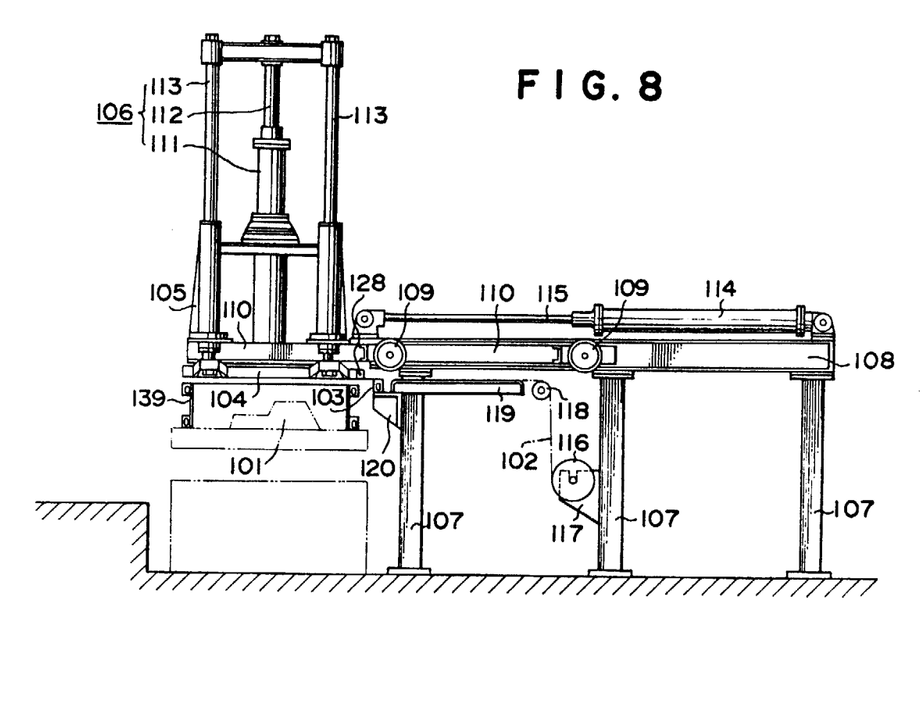
FIG. 8 is a front elevation of a covering sheet applying unit in another embodiment of the present invention.
Figure 9:
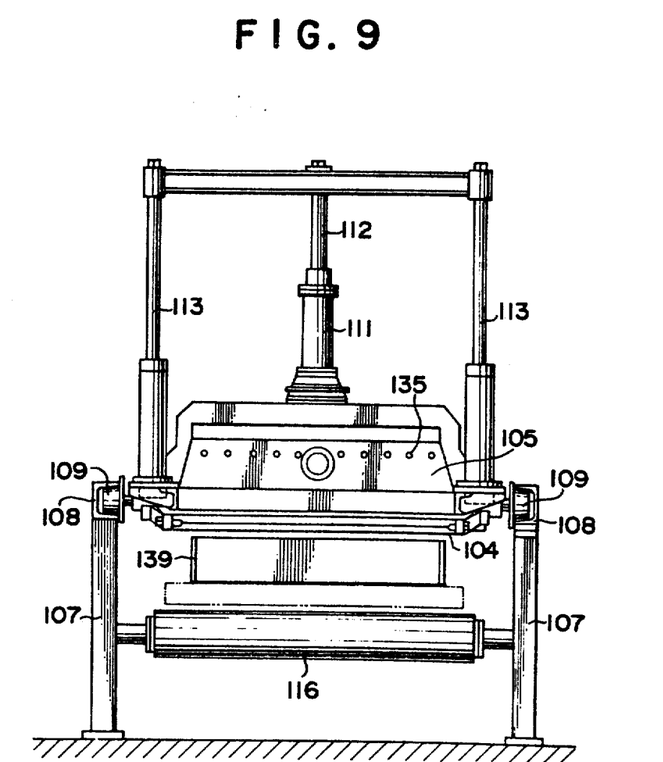
FIG. 9 is a side elevation of the unit shown in FIG. 8.

FIGS. 8 to 18 show another embodiment of the present invention. Referring to FIGS. 8 and 9, a covering sheet applying unit includes a pair of rails 108 formed by channel bars. These rails 108 are supported on a frame structure 107 upstanding from a foundation and four wheels 109 of a carriage 110 engage the channels of the rails 108 so that the carriage 110 can move to and fro on the rails 108. A heat insulation hood 105 having a sheathed heater 135 is disposed on a frame member 104 generally like a window frame which acts to draw a covering sheet 102 of synthetic resin or like material thereonto by vacuum suction. Means 106 for causing vertical movement of the frame member 104 is composed of an air cylinder 111, a piston rod 112 extending from the cylinder 111, and four guide rods 113 connected to the frame member 104. This lifting means 106 is carried by the carriage 110 in a manner as seen in FIG. 8. The carriage 110 is advanced and retracted by a piston rod 115 actuated by an air cylinder 114 so as to make reciprocating movement between two positions shown by the vertical lines X—X and Y—Y in FIG. 8, the line X—X coinciding with the vertical axis of a pattern 101. FIG. 8 shows the state in which the frame member 104 is moved to the position represented by the line X—X. This arrangement facilitates disposition and removal of a large-sized flask due to the fact that a wide upper open space is available for the purpose.

A web of synthetic resin material for providing the covering sheet 102 is wound around a supply roll 116 rotatably supported by a pair of brackets 117 fixed to the frame structure 107. The covering sheet 102 supplied from the supply roll 116 is fed past an idler 118 disposed beneath the rails 108 and then past a supporting plate 119 for preventing drooping of the sheet 102 to be drawn onto the upper surface of a sheet holding member 103 supported by a pair of brackets 120 fixed to the frame structure 107.

Figures 10, 11:
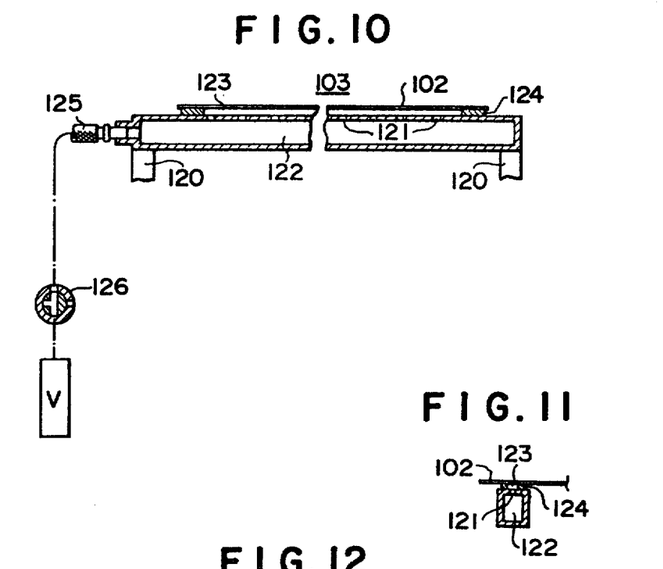
FIG. 10 is an enlarged vertical section of a covering sheet holding member in the another embodiment.
FIG. 11 is a vertical section of the member shown in FIG. 10.

The sheet holding member 103 is provided with a vacuum chamber 122 having many aligned perforations 121 bored in the upper wall thereof as seen in FIGS. 10 and 11 and an anti-skid member 124 having a vacuum suction applying slot 123 extending in a direction registering with the line connecting the centers of the perforations 121 is fixed on the sheet holding member 103 for preventing skidding of the covering sheet 102. A filter such as a wire gauze or felt filter is disposed in the vacuum suction applying slot 123 of the anti-skid member 124, and the vacuum chamber 122 is connected to a vacuum source V through a pipe joint, a hose 125 and a valve 126 such as a three-way valve.

Figures 12, 13:
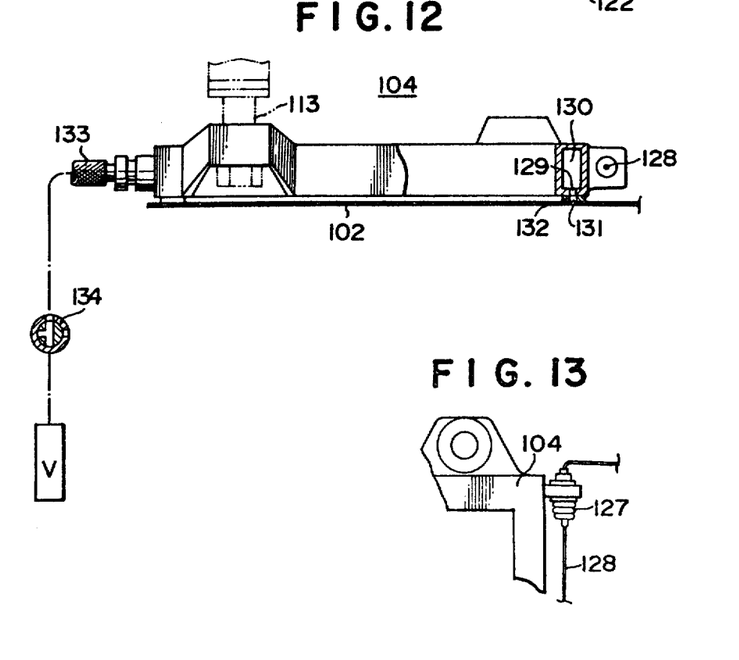
FIG. 12 is an enlarged partly sectional, front elevation of a frame member in the covering sheet applying unit shown in FIG. 8.
FIG. 13 is an enlarged partial plane view showing the arrangement of a heater mounted on the covering sheet applying unit for cutting the covering sheet in the another embodiment.

Referring to FIGS. 12 and 13, a heater 128 of nichrome wire extends through a pair of insulators 127 fixed to the ☐-shaped frame member 104, and a vacuum chamber 130 is formed in the frame member 104. Many aligned perforations 129 are bored in the lower walls of the vacuum chamber 130 and anti-skid members 132 having a vacuum suction applying slot 131 registering with these perforations 129 are fixed to the lower walls of the vacuum chamber 130 for preventing skidding of the covering sheet 102. A filter similar to that described with reference to the slot 123 is disposed in the slot 131, and the vacuum chamber 130 is connected to the vacuum source V through a pipe joint, a hose 133 and a valve 134 such as a three-way valve.

Figure 14:
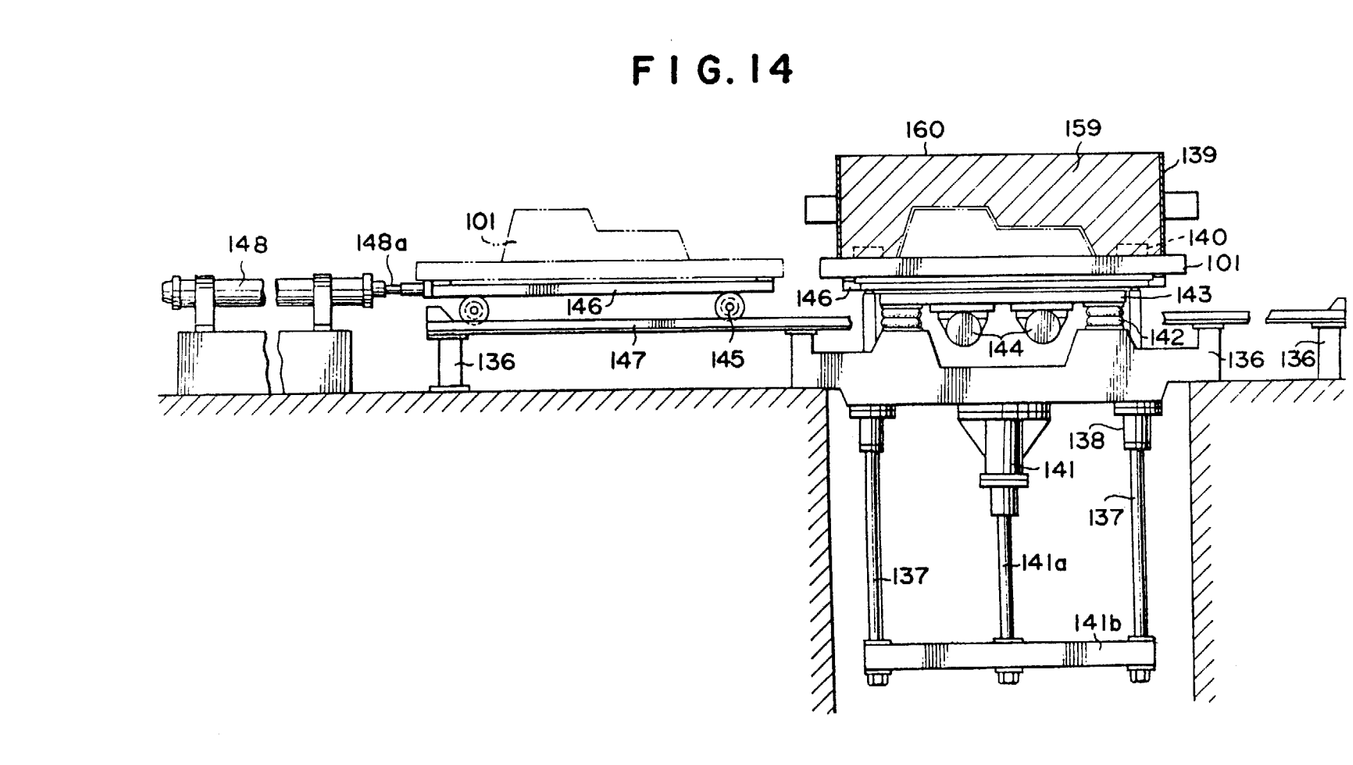
FIG. 14 is a front elevation of a pattern lifting unit in the second embodiment of the present invention.
Figures 15, 16:
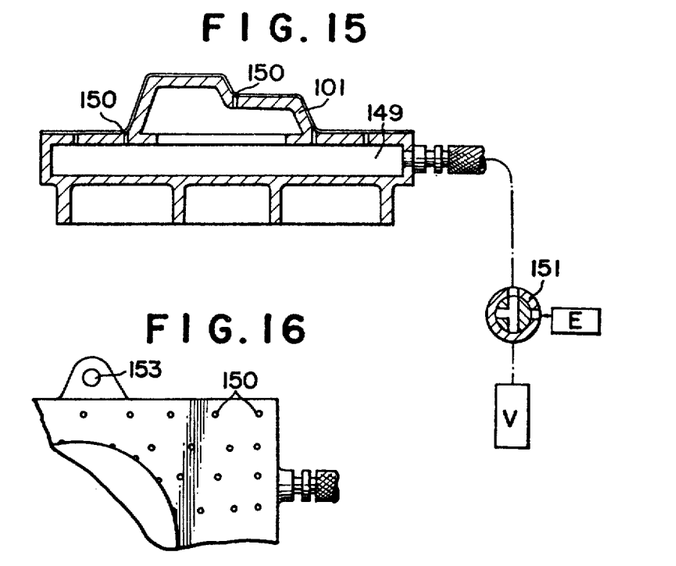
FIG. 15 is an enlarged vertical section of a pattern plate carrying a pattern thereon in the another embodiment.
FIG. 16 is a partial plane view of FIG. 15.
Figures 17, 18:
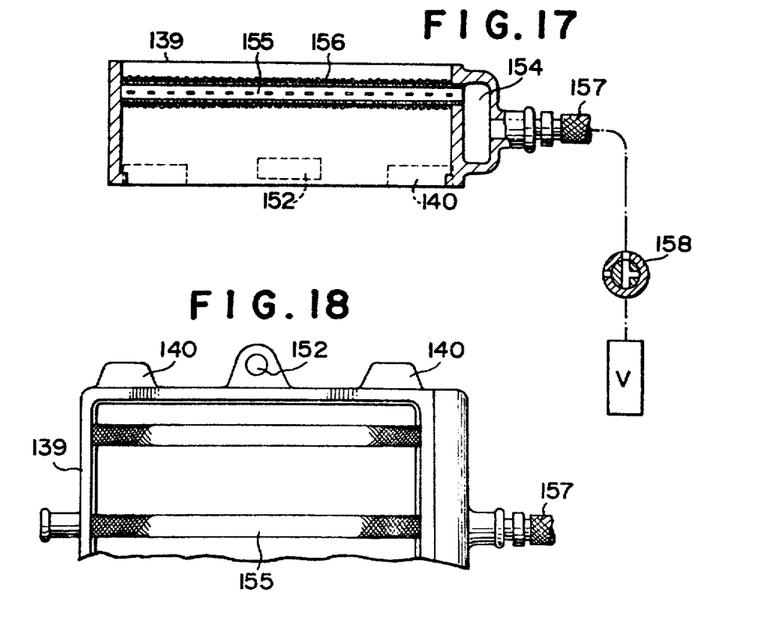
FIG. 17 is an enlarged vertical section of a flask shown in FIG. 14.
FIG. 18 is a partial plane view of FIG. 17.

Referring to FIG. 14 showing a pattern lifting unit four bushes 138 for guiding vertical movement of respective mold releasing pins 137 are secured to a frame structure 136. These pins 137 are engageable with corresponding abutments 140 extending from the side walls of a flask 139 (FIGS. 17 and 18) and an air cylinder 141 for causing vertical movement of the pins 137 is secured to the frame structure 136. A piston rod 141a extends downward from the air cylinder 141 and is fixed at its lower end to a member 141b interconnecting the lower ends of the pins 137. A table 143 is supported above the frame structure 136 through four air cushions 142 and a pair of vibrating motors 144 are mounted on the lower surface of the table 143. A carriage 146 having four wheels 145 is arranged to run on a pair of rails 147 and is formed with a longitudinal opening in a frame of the carriage 146 supporting the pattern 101 thereon. The carriage 146 mounting the pattern 101 shown in FIG. 15 thereon is connected to a piston rod 148a of an air cylinder 148 disposed on the foundation so as to make reciprocating movement between two positions shown by the lines X—X and Z—Z in FIG. 14. The line Z—Z coincides with the vertical axis of the table 143. Referring to FIG. 15, the pattern 101 is formed with many perforations 150 communicating with a vacuum chamber 149 disposed therebeneath, and the vacuum chamber 149 is connected to the vacuum source V and to atmospheric pressure or a compressed air source E through a three-way valve 151. A pair of guide pins 153 extend upward from side extensions of the pattern 101 so as to fit in corresponding guide holes 152 bored in side extensions of the flask 139 as shown in FIGS. 16, 17 and 18. As shown in FIGS. 17 and 18, the flask 139 comprises a vacuum chamber 154, a plurality of perforated tubes 155 terminating at one end thereof in the vacuum chamber 154, and a filter 156 such as a wire gauze surrounding the outer periphery of each of the perforated tubes 155, and the vacuum chamber 154 is connected to the vacuum source V through a pipe joint, a hose 157 and a valve 158 such as a three-way valve. In FIG. 14, a heat resisting particulate material 159 such as sand is charged into the flask 139, and after charging of the particulate material 159, the upper end opening of the flask 139 is closed by a thin sheet 160 of synthetic resin or like material.

Before the molding operation is started, the carriage 146 mounting the pattern 101 thereon is in the position shown by the line X—X in FIG. 14 and the carriage 110 carrying the frame member 104 is in the retracted position. Thus, the frame member 104 is in the position shown by the line Y—Y in FIG. 8. The frame member 104 is kept at its uppermost position by the air cylinder 111. The leading end portion of the covering sheet 102 is drawn onto the sheet holding member 103 by the vacuum suction and tension is applied to the trailing end portion of the sheet 102 supplied from the supply roll 116 by way of the idler 118. The piston rod 141a of the air cylinder 141 in the pattern lifting unit in FIG. 14 is extended to bring the releasing pins 137 to their downwardmost position.

In operation, the valve 134 in the hose 133 connecting the vacuum source V to the vacuum chamber 130 of the frame member 104 shown in FIG. 12 is manipulated to cause communication of the vacuum chamber 130 with the vacuum source V thereby evacuating the vacuum chamber 130. Due to the evacuation of the vacuum chamber 103, the covering sheet 102 underlying the frame member 104 is drawn onto the surface of the anti-skid members 132 by the vacuum suction without producing any wrinkles. At the same time, the valve 126 in the hose 125 connecting the vacuum source V with the vacuum chamber 122 of the sheet holding member 103 shown in FIG. 10 is manipulated to disconnect the vacuum chamber 122 from the vacuum source V and to cause communication of the vacuum chamber 122 to the atmosphere. As a result, the atmospheric pressure is supplied into the vacuum chamber 122 to release the vacuum suction applied to the covering sheet 102. Subsequently, the air cylinder 114 is actuated to advance the carriage 110 thereby bringing the frame member 104 to the position shown by the line X—X in FIG. 8. With the advancing movement of the frame member 104, a substantial length of the covering sheet 102 is supplied from the supply roll 116, and when the frame member 104 is brought to the position shown by the line X—X, the valve 126 is manipulated to cause communication of the vacuum chamber 122 of the sheet holding member 103 with the vacuum source V thereby drawing and holding the corresponding portion of the covering sheet 102 on the sheet holding member 103 by the vacuum suction. Then, current is supplied to the sheathed heater 135 in the heat insulation hood 105 for heating the portion of the covering sheet 102 held on the frame member 104. When the covering sheet 102 is heated to a suitable temperature, the air cylinder 111 is actuated to cause downward movement of the frame member 104 and hood 105. During this downward movement of the frame member 104, the covering sheet 102 is cut into a predetermined length by the heater 128 which has been supplied with current prior to such downward movement. The valve 151 in the conduit connecting the vacuum source V with the vacuum chamber 149 of the pattern 101 is then manipulated to cause communication of the vacuum source V with the vacuum chamber 149 thereby evacuating the vacuum chamber 149. As a result, the covering sheet 102 is now drawn onto the surface of the pattern 101 by the vacuum suction applied through the perforations 150. When the frame member 104 is lowered to engage the surface of the pattern 101, the operation of the air cylinder 111 is ceased and the valve 134 in the hose 133 connected to the vacuum chamber 130 of the frame member 104 is manipulated to cause communication of the vacuum chamber 130 with the atmosphere thereby releasing the vacuum suction applied to the covering sheet 102, the heater 128 being also deenergized. As a result, the covering sheet 102 is completely transferred onto the surface of the pattern 101. Subsequently, the air cylinder 111 is actuated to cause upward movement of the frame member 104 for restoring same to the original position, and the air cylinder 114 is actuated to cause retracting movement of the carriage 110 carrying the frame member 104 for retracting the frame member 104 to the original position shown by the line Y—Y in FIG. 8. This completes one cycle of the operation of the covering sheet applying unit.

The pattern 101 having been applied with the covering sheet 102 is transferred to the position shown by the line Z—Z in FIG. 14 by the action of the air cylinder 148 operatively connected to the carriage 146 carrying the pattern 101 thereon. In the pattern lifting unit shown in FIG. 14, air pressure is applied to the interior of the air cushions 142 for causing slight upward movement of the table 143 so as to receive the pattern 101 on the table 143 from the carriage 146. After mounting the flask 139 on the pattern 101 by means such as a crane, the particulate material 159 is compactly charged into the flask 139 from a hopper (not shown) while vibrating the flask 139 by the vibrating motors 144. Then, the upper end opening of the flask 139 is closed by a thin sheet 160 of synthetic resin or like material, and the valve 158 in the hose 157 connecting the vacuum chamber 154 of the flask 139 with the vacuum source V is manipulated to cause communication of the vacuum chamber 154 with the vacuum source V thereby evacuating the interior of the flask 139. Thus, the particulate material 159 within the flask 139 is compacted by atmospheric pressure imparted thereto through the sheet 160.

Subsequently, air in the air cushions 142 is discharged and the pattern 101 and flask 139 are lowered to be transferred onto the carriage 146. The valve 151 in the conduit connected to the vacuum camber 149 of the pattern 101 is then manipulated to supply external air into the vacuum chamber 149 thereby releasing the vacuum suction applied to the covering sheet 102. Then, when the air cylinder 141 is actuated to cause upward movement of the flask 139 by the releasing pins 137, the covering sheet 102 is drown to the side of the particulate material 159 in the flask 139 while maintaining the corresponding shape of the pattern 101 due to the fact that the vacuum is established within the flask 139. Thus, a mold is obtained by the particulate material 159 and covering sheet 102. Upon completion of the mold, the flask 139 is conveyed by means such as a crane, the releasing pins 137 are then lowered by the action of the air cylinder 141, and the carriage 146 is retracted to the original position shown by the line X—X, thereby completing one molding cycle.

In this embodiment, the carriage 146 in the pattern lifting unit shown in FIG. 14 has been arranged to run in a direction perpendicular with respect to the running direction of the carriage 110 in the covering sheet applying unit shown in FIG. 8. However, these carriages may be arranged to run in the same direction.

It will be understood from the foregoing description that a covering sheet can be automatically, simply and easily applied to the surface of a pattern by a unique covering sheet applying unit according to the present invention, and this covering sheet applying unit can be conveniently incorporated in a molding machine due to the fact that this unit is independent of other units.

We claim:

1. A vacuum sealed molding apparatus comprising
means for transferring a pattern fixed on a pattern plate from a first position to a second position and then from said second position to said first position, said second position being apart from the first position and provided with means for supplying a charge of heat resisting particulate material into a flask which is conveyed to said second position;

covering sheet supplying means disposed at a third position apart from said first and second positions for holding a web of a covering sheet of synthetic resin in a roll form;

a frame member movable from said first position to said third position and then from said third position to said first position and consisted of surrounding side walls forming an open end thereof and a vacuum chamber provided along the side walls having a slot to draw said covering sheet to said slot by vacuum suction, said frame member being operative to hold said covering sheet on the surface of said open end by said vacuum suction when it is moved to said third position and to pull out said sheet from said supplying means when being moved to said first position whereby said pulled out sheet is supplied at the third position so that said frame member moved again to the third position is adapted to hold said sheet;

means for causing vertical movement of said frame member holding said sheet or said pattern transferred to said first position relatively toward each other so as to apply said covering sheet on the surfaces of the pattern and the pattern plate and means disposed at the second position for causing vertical movement of said flask or said pattern relatively so as to set the flask on the pattern covered with the covering sheet and then remove said pattern from the flask after molding.

2. A vacuum sealed moulding apparatus as claimed in claim 1, wherein means are provided for heating said covering sheet held on the surface of said open end whereby facilitating plastic deformation of said sheet when applying the sheet on the surfaces of the pattern and the pattern plate.

* * * * *